(12) United States Patent
Houle

(10) Patent No.: US 6,531,057 B1
(45) Date of Patent: Mar. 11, 2003

(54) METHOD AND APPARATUS FOR SEPARATING SOLID MATERIAL FROM WATER USED TO FLUSH LIVESTOCK FLUSH LANES

(76) Inventor: Rejean Houle, 670 Coral St., Tulare, CA (US) 93274

( * ) Notice: Subject to any disclaimer, the term of this patent is extended or adjusted under 35 U.S.C. 154(b) by 0 days.

(21) Appl. No.: 09/865,818

(22) Filed: May 25, 2001

(51) Int. Cl.$^7$ ................................................ B01D 21/24
(52) U.S. Cl. ..................... 210/104; 210/138; 210/170; 210/195.1; 210/196; 210/747; 210/790; 119/450; 119/527
(58) Field of Search .............................. 210/747, 767, 210/790, 744, 104, 138, 170, 195.1, 196; 119/450, 527

(56) References Cited

U.S. PATENT DOCUMENTS

| | | | |
|---|---|---|---|
| 3,918,404 A | * 11/1975 | Bunger | 119/450 |
| 4,193,823 A | * 3/1980 | Thrasher | 210/170 |
| 6,039,874 A | * 3/2000 | Teran et al. | 210/195.1 |
| 6,083,386 A | * 7/2000 | Lloyd | 210/195.1 |
| 6,190,566 B1 | * 2/2001 | Kolber | 119/450 |

\* cited by examiner

*Primary Examiner*—Christopher Upton
(74) *Attorney, Agent, or Firm*—Sierra Patent Group, Ltd.

(57) ABSTRACT

A method and apparatus for flushing flush lanes comprising providing a process pit to recycle flushed water; providing a solid waste separator; providing a storage lagoon; pumping a first selected volume of water from the storage lagoon and a second volume of water from the process pit through the flush lanes; collecting water flushed through the flush lanes and solid waste carried therewith in the process pit; separating solid waste from a third volume water from the process pit in said solid waste separator and returning the third volume of water less the solid waste to the storage lagoon.

10 Claims, 4 Drawing Sheets

METHOD AND APPARATUS FOR SEPARATING SOLID MATERIAL FROM WATER USED TO FLUSH LIVESTOCK FLUSH LANES

BACKGROUND OF INVENTION

1. Field of Invention

The field of the claimed invention is the separation of solid waste from water used in flushing livestock flush lanes.

2. The Background Art

On dairy farms, dairy cows eat and walk on concrete flush lanes. )While in these lanes, the cows excrete solid and liquid waste, approximately 15 to 20 gallons of solid waste per cow per day. The solid waste is a valuable commodity and is used for fertilizing as well as creating bedding for cows. Thus, dairy farms pump water from large storage lagoons into the dairy cow flush lanes in order to flush the lanes and collect the solid and liquid waste, in a storage pit from which it is mixed and pumped over a screen separator to remove the solids from the water.

It is known in the art to pump the flushed water, that is water that has already been flushed down the dairy cow flush lane, to a solid waste separator. One known method of separating the solid waste is to use a metal screen filter, onto which the flushed water is pumped. The water passes through the metal screen while a percentage of the solid waste remains on the top surface of the metal screen filter. The solid waste slides off the screen onto a solid waste storage slab. The solid waste then can be removed from the storage slab and used for fertilizer, or it may be further processed into a compost heap to make a more valuable form of fertilizer. Once a percentage of solid waste is removed from the flushed water, the flushed water is drained into a storage lagoon. The flush cycle repeats by pumping water from the storage lagoons down the dairy cow flush lanes.

FIG. 1 shows a known method of flushing dairy cow flush lanes and separating solid waste from the flushed water. Water is stored in the storage lagoon 110. Flush pump 120 pumps water from the storage lagoon to the dairy cow flush lanes 130. Flushed water drains from the dairy cow flush lanes to a mixing pit and is then pumped by an agitator pump 140 to the solid waste separator 150. The solid waste separator 150 separates a percentage of the solid waste from the flushed water, whereupon the waste is deposited onto the solid waste storage slab 160. The processed flushed water is then drained from the separator 150 back to the storage lagoon 110. The arrows in FIG. 1 indicate the direction of the flow in the water lines.

A typical dairy farm may have 5,000 dairy cows, and 35 dairy cow flush lanes. A typical flush pump has a 2200 gallon per minute capacity. Usually, each dairy cow flush lane has a flush lane valve, which opens for each lane for 5 minutes at a time during each flush cycle. Thus, 2,200 gallons per minute is flushed down each flush lane for 5 minutes, thereby using 11,000 gallons per flush cycle per lane. Since a typical dairy farm has approximately 35 flush lanes, and a typical dairy farmer flushes at least 4 times a day, and each cow produces 15 gallons of waste per day, the following equation gives the amount of water that must be processed at the solid waste separator:

$$11,000 \; \frac{gal}{lane} \times 35 \; flush \; lanes \times 4 \; \frac{flushes}{day} +$$

-continued
$$15 \; \frac{gal \; of \; waste}{cow} \times 5,000 \; cows = 1,615,000 \; \frac{gal}{day}$$

Thus, 1,615,000 gallons of water per day must be pumped and processed through the solid waste separator before the water is redirected back to the storage lagoon.

FIG. 2 shows a schematic of a solid waste separator, the flushed water in the known dairy cow flush lane system is pumped directly to the solid waste separator 200. The flow of the pumped flushed water into the solid waste separator is shown by the arrow 210. The flushed water then flows down the metal screen filter 230, which allows the water to pass through, but stops the solid waste 250 from flowing through the metal screen filter. A series of clean water spray nozzles 220 are installed over the surface of the screen to keep the surface and the solids moist between each cycle of using the separator, thus preventing the solid waste from drying and sticking to the screen surface and insuring good operating conditions at the beginning of the next cycle. The flushed water, having been processed through the metal screen filter 230, drains out to the storage lagoon, the flow of the processed flushed water is indicated by arrow 260.

FIG. 3 shows a solid waste separator 200 coupled to a conveyor system 300. The conveyor system adds one more step in the processing of the solid waste, by moving the solid waste 310, which came from the solid waste separator 200, up a screen conveyor 320. The conveyor moves the solid waste into a spring loaded tunnel press 330, which removes excess water from the solid waste. The excess water drains to either the process pit or the storage lagoon through pipe 350. The solid waste drops and stacks into a solid waste stack 340. This extra step allows the solid waste to stack higher and drier. The drier the solid waste is, the easier it is to move and it is easier to convert to a compost stack. Compost is a more valuable form of fertilizer.

A problem in the prior art dairy cow flush lane system, is that the flushed water drained from the solid waste separator often contains a high percentage of solid waste. This is due to the fact that the more diluted the solid waste in the water is, the less efficient the metal screen filter is in removing solid waste from the flushed water. Water that contains 0.5% solid waste does not filter as efficiently as water that contains 2% solid waste. This results in dirty water being drained into the storage lagoon. After each flush cycle, the storage lagoon collects more solid waste. Methane gas buildup occurs in the storage lagoon, and the gas is then released into the atmosphere, causing pollution. The water in the storage lagoon is also used to fertilize fields, once the storage lagoon becomes too dirty, the fields and crops can be damaged by the high content of solid waste in the water. Also, as the storage lagoon water contains more solid waste, it becomes more difficult to properly flush the dairy cow flush lanes with the storage lagoon water that already has high levels of solid waste material. Another drawback to the typical dairy cow flush lane system, is that for every gallon pumped down the flush lane, that same amount of water must first be pumped through a solid waste separator pump, plus any waste collected to the solid waste separator, before being drained back to the storage lagoon. This means that a solid waste separator pump must run for long periods of time due to the high volume of flushed water used and solid waste resulting from flushing the dairy cow flush lanes. Thus, because the solid waste separator pump runs for such a long period of time, there are associated high energy costs of running the pump plus higher maintenance and repair cost.

SUMMARY OF THE INVENTION

The present invention relates to a method for flushing dairy cow flush lanes where a processing pit is used to reduce the total amount of flushed water that must be sent to a solid waste separator every day, thereby reducing energy costs and improving the efficiency of the solid waste separator. The method includes flushing dairy cow flush lanes from a processing pit, draining the flushed water back into the same processing pit and reusing the same water to flush many lanes to increase the amount of solid waste in the recycled water before pumping the water from the processing pit to a solid waste separator, draining water from the solid waste separator to a storage lagoon or back to the processing pit. Water from both the storage lagoon and processing pit is pumped to the dairy cow flush lanes, where the process repeats.

The present invention also relates to an apparatus for flushing dairy cow flush lanes comprising a first flush pump that pumps water from a storage lagoon into dairy cow flush lanes for a first pre-selected amount of time during a day, a second flush pump that pumps water from a processing pit into the dairy cow flush lanes for a second pre-selected amount of time during a day. After a flush cycle, when the water in the process pit reaches a pre-selected maximum level, a water sensor level switch activates an agitator pump that pumps water from the process pit to a solid waste separator. When the water in the process pit reaches a pre-selected minimum level, the water sensor level switch deactivates the agitator pump, thus stopping the pumping of water from the process pit to the solid waste separator.

The features mentioned in the subclaims relate to further developments of the solution according to the invention. Further advantages of the invention are found in the following detailed description.

BRIEF DESCRIPTION OF THE DRAWINGS

The present invention is described in greater detail by referencing the accompanying drawings.

DETAILED DESCRIPTION

Those of ordinary skill in the art will realize that the following description of the present invention is illustrative only and not in any way limiting. Other embodiments of the invention will readily suggest themselves to such skilled persons.

Figure 1:
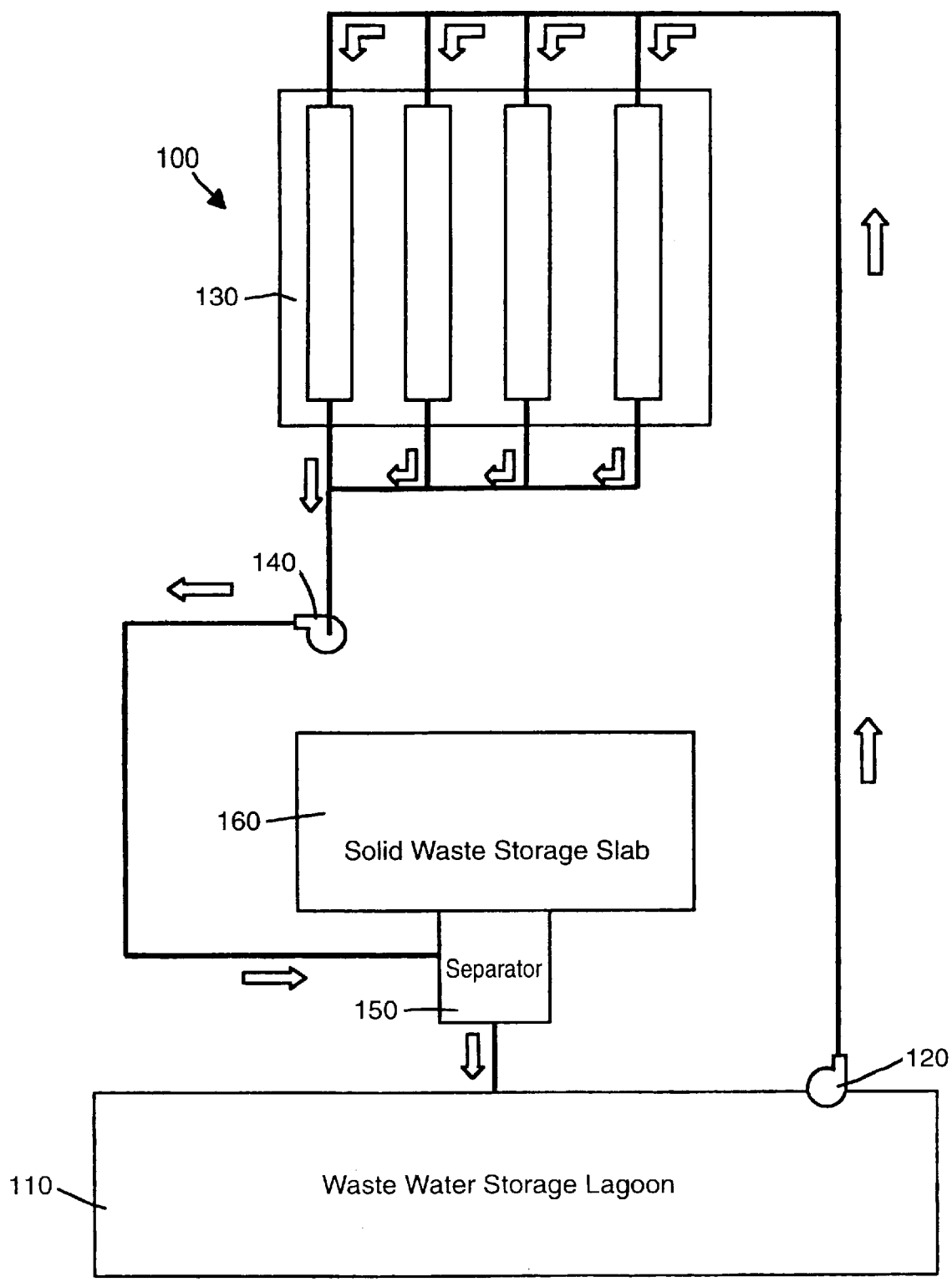
FIG. 1 is a schematic diagram of a known dairy cow flush lane flush system.
Figure 2:
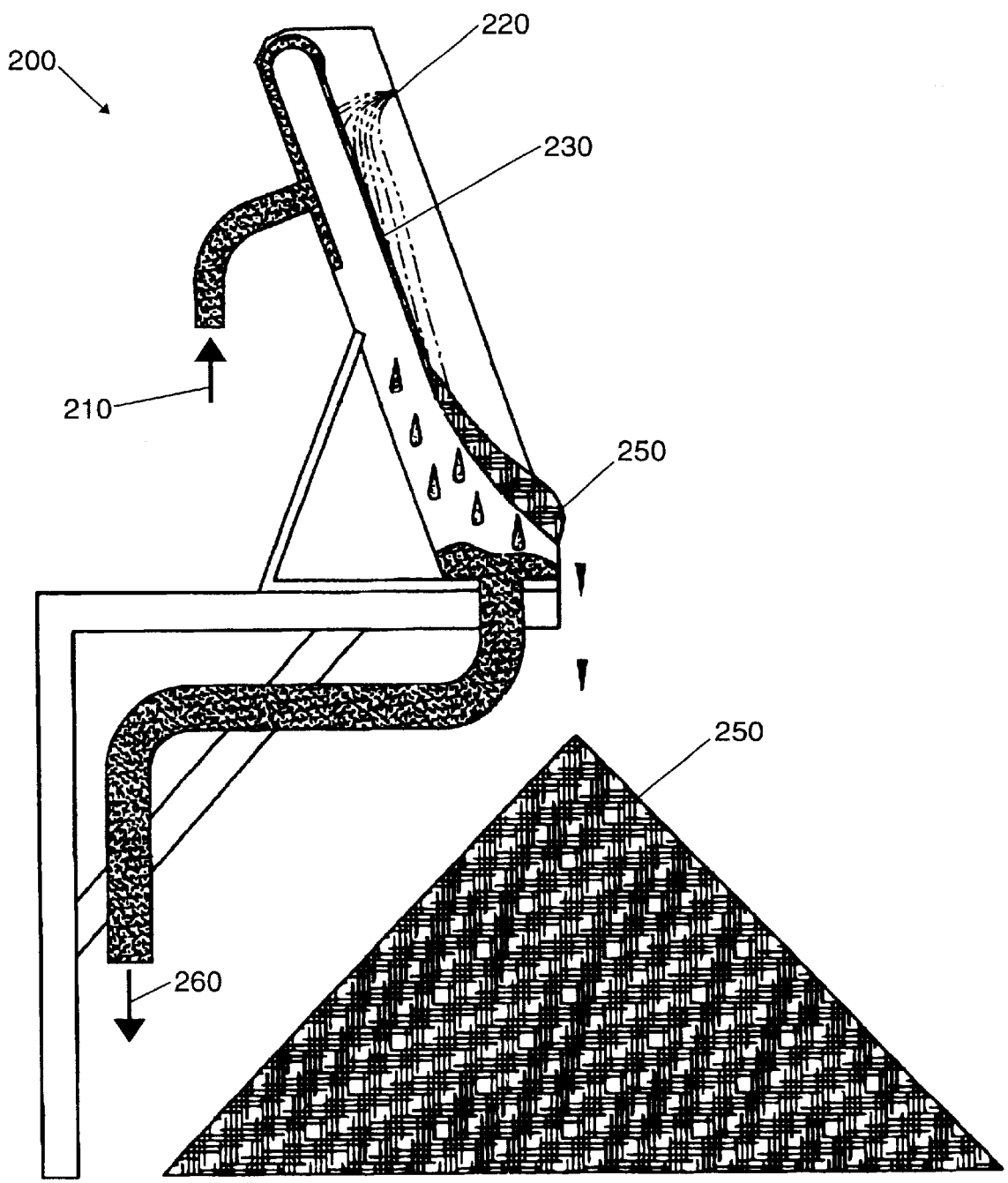
FIG. 2 is a schematic diagram of a known solid waste separator.
Figure 3:
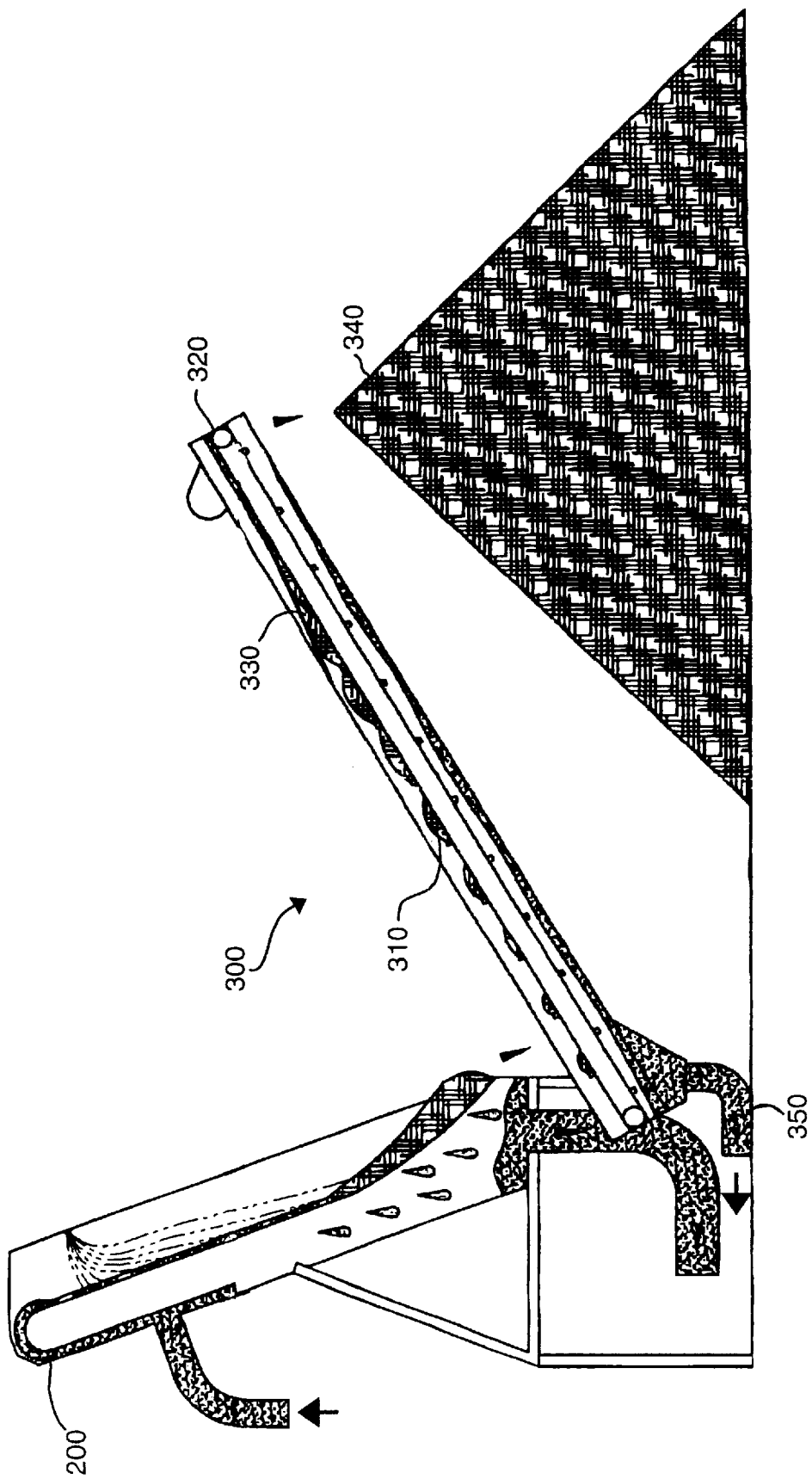
FIG. 3 is schematic diagram of a known solid waste separator and a solid waste screen conveyor system.
Figure 4:
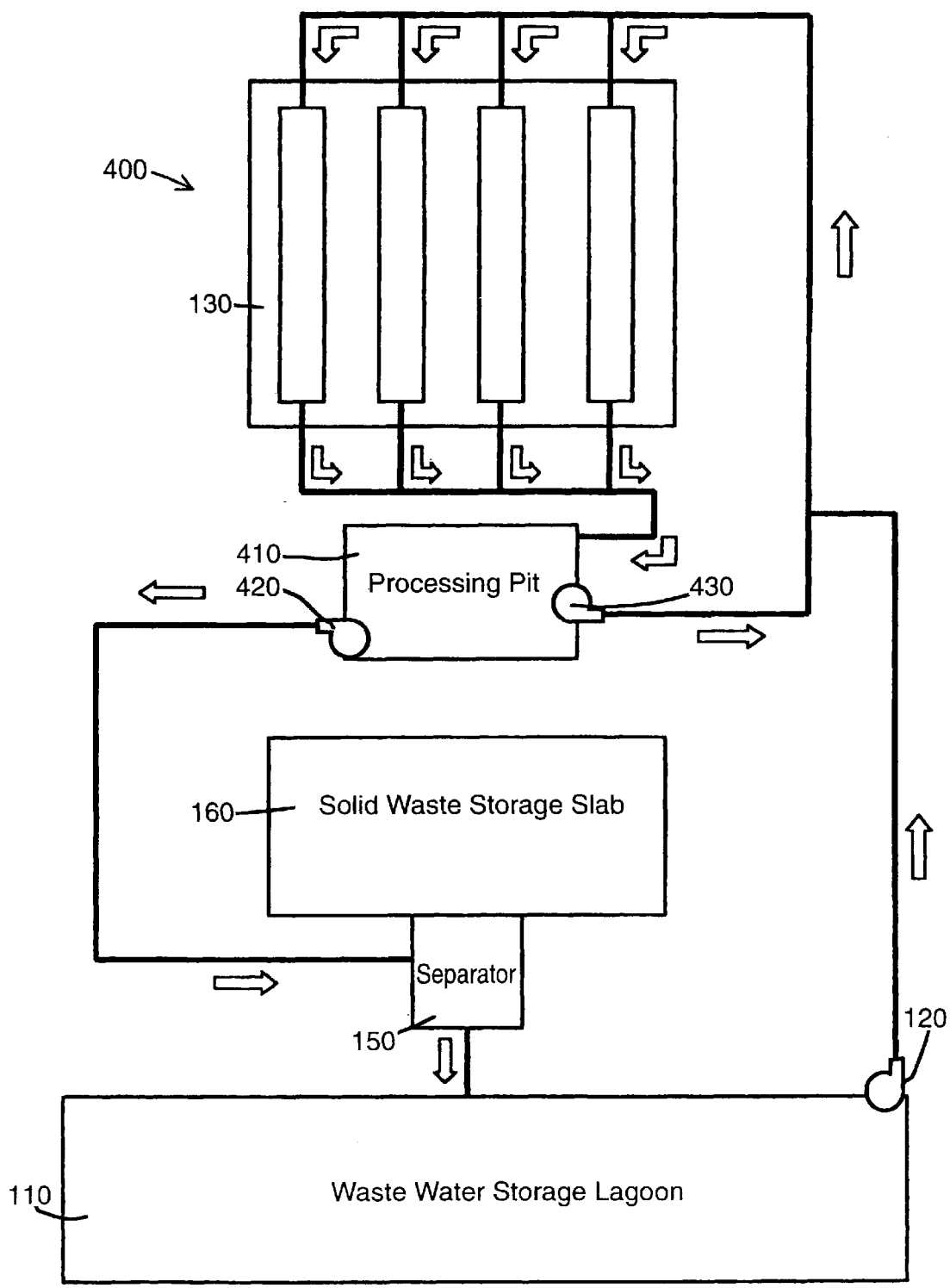
FIG. 4 is a schematic diagram of one embodiment of the present invention.

One embodiment of the current invention is shown in FIG. 4. A dairy cow flush system 400 is shown. Flushed water drains from the dairy cow flush lanes 130 through a pipe system commonly known in the art to the processing pit 410.

The processing pit 410 may be a cement pit having an exemplary volume of about 30,000 gallons to 100,000 gallons in size. The processing may also be a storage tank of the same size, or a fiber-glass covered pit of the same size. The processing pit may be any sort of water storage device that can hold such volume of water. Non-limiting examples of types of processing pits are: uncovered square concrete walled processing pits; uncovered round concrete-walled processing pits; uncovered rectangular concrete-walled processing pit; uncovered cement-walled processing pit; and uncovered brick-walled processing pits. The processing pit must also be able to contain a flush pump and an agitator pump.

Agitator pump 420 pumps processing pit water to the solid waste separator 150 through a pipe system commonly known in the art. The agitator pump is a pump that agitates the solid waste and water in the processing pit so that more solid waste can be pumped to the solid waste separator. Non-limiting examples of types of agitator pumps are centrifugal chopper pumps directly coupled to an agitator, a centrifugal chopper pump and a separate agitator, wherein the agitator pre-agitates the water before the centrifugal chopper pump activates. Two non-limiting examples of suppliers of agitator pumps are US Farm Systems and Houle Agitator Pumps.

The solid waste separator 150 may be a single metal screen filter system or a double metal screen filter system. The metal screen filter can have a mesh size of 0.008" up to 0.045". The solid waste separator may also be coupled to a screen chain conveyor with a spring loaded tunnel press, which further processes the solid waste by removing more water from the waste, thereby allowing the waste to stack better and higher. The storage pit water processed by the solid waste separator drains from the separator to the storage lagoon 110 through a pipe system commonly known in the art.

The storage lagoon 110 is commonly known in the art, and is usually a large hole dug into the dairy farm property. The storage lagoon is usually built to hold enough water to ensure a 3 to 6 month supply of water for dairy farm use, including flushing and separating of solid matter. The size of the lagoon may be determined by the following non-limiting illustrative calculation:

20 to 60 gal. per day, per cow×number of cows×days of storage

Thus, on a farm with 5,000 cows that requires 6 months of storage, the above equation becomes:

30 gal×5,000 cows×180 days of storage=27,000,000 gal

The storage lagoon is coupled to a centrifugal flush pump 120, that pumps water to the dairy cow flush lanes 130 to flush the dairy cow flush lanes.

The storage lagoon pump 120 can be a floating pump from 10 HP to 75 HP in size. This pump has a check valve that prevents water from draining back into the process pit and lagoon. Non-limiting examples of storage lagoon pumps are: centrifugal chopper pumps, centrifugal pumps, wall-mounted pumps; floating pumps.

The processing pit 410 also is coupled to a flush pump 430 used to send water to the dairy cow flush lanes 130, in order to flush the lanes. The processing pit flush pump 430 can be a floating centrifugal chopper pump from 20 HP to 75 HP in size. This pump has a back-flow valve that prevents water from draining back into the process pit and lagoon. The processing pit flush pump can also be a stationary wall mounted centrifugal chopper pump from 20 HP to 75 HP in size. A non-limiting example of a processing pit pumps would be centrifugal chopper pumps.

Flush pumps 120 and 430 pump water to dairy cow flush lanes 130 via a pipe system commonly known in the art.

One advantage of the present invention is that there is no need to pump the flushed water immediately to the solid waste separator 150, because the water is being recycled many times to flush more lanes from the processing pit before it is pumped over solid separator.

According to one aspect of the present invention, about 80 gallons of new water per cow per day is used to flush the dairy cow lanes. This is water that may come from a storage lagoon or from barn use, or any other supply of relatively clean water. Thus, on a typical 5,000 cow dairy farm, the amount of new water necessary to flush the lanes may be determined by the following non-limiting equation:

$$5{,}000 \text{ cows} \times 80 \frac{\text{gal}}{\text{cow/day}} = 400{,}000 \frac{\text{gal}}{\text{day}}$$

Cows produce waste at a rate of 15 to 20 gallons per day, thus the total volume of flushed water being added to the processing pit after a day's flushing may be determined by the following equation:

$$5{,}000 \text{ cows} \times 15 \frac{\text{gal waste}}{\text{cow/day}} + 400{,}000 \frac{\text{gal}}{\text{day}} = 475{,}000 \frac{\text{gal}}{\text{day}}$$

Thus, 475,000 gallons of water and waste is added to the process pit per day. In order to keep the process pit level, only 475,000 gallons of processing pit water per day need be pumped to the solid waste separator. This is a vast improvement over the known system, where 1,615,000 gallons of flushed water needed to be sent to the solid waste separator. Assuming a solid waste pump capacity of 2,200 gallons per minute and an agitator pump capacity of 1,500 gallons per minute, the respective agitator pump daily operating time is given by the following equations:

$$\text{KNOWN METHOD} \quad 1{,}615{,}000 \text{ gal} \div 2200 \frac{\text{gal}}{\text{min}} = 734.1 \text{ minutes} = 12.2 \text{ hours}$$

$$\text{CURRENT INVENTION} \quad 475{,}000 \text{ gal} \div 1500 \frac{\text{gal}}{\text{min}} = 316 \text{ minutes} = 5.27 \text{ hours}$$

Since the agitator pump in the invention needs to run only 5.27 hours per day, as opposed to 12.2 hours per day for the solid waste pump, the energy costs in running the agitator pump in the present invention is much lower. Further, since the process pit has a higher concentration of solid waste, and water is pumped from the process pit to the solid waste separator, and not from the storage lagoon, the solid waste separator is able to remove more solid waste. The solid waste separator removes up to two-thirds more solid waste in the present invention than in the known system. Since water from the solid waste separator has two-thirds more solid waste removed from it in the present invention, as the water drains from the solid waste separator to the storage lagoon, the storage lagoon remains cleaner, with less solid waste in it.

Dairy farmers often use what is commonly known as barn water for washing cows and cleaning dairy equipment. On a typical 5,000 cow dairy farm, a typical amount of barn water used is 200,000 gallons per day. One aspect of the present invention is to use this barn water in the flush system, thus once the barn water has been used for cleaning cows and dairy equipment, it may be drained into the process pit for use in the flushing of dairy cow flush lanes.

An other embodiment of the present invention is to use two solid waste separators in parallel with each other. That is as the process pit water is pumped from the process pit, the water line is split into two water lines, each water line going to one of two parallel solid waste separators. This allows a dairy farmer to increase his rate of solid waste separation.

An other embodiment of the invention is to use two solid waste separators in series with one an other. The first solid waste separator has a larger mesh size than the second solid waste separator. This setup allows for a two step filtering process of the flushed water, wherein the first solid waste separator filters the larger solid material from the flushed water, and the second solid waste separator filters out smaller solid waste material from the flushed water. The solid waste stack from the first solid waste separator is often used for cow bedding. The solid waste stack from the second solid waste separator contains more fertilizing nutrients, and is a more valuable fertilizer.

In an embodiment of the present invention, the process pit has a water sensor level switch with a low level setting and a high level setting. Once the water in the process pit reaches the high level setting, the water sensor level switch activates the process pit agitator pump, thereby mixing the solid waste and water in the storage pump, and pumping the mixture of flushed water and solid waste to the solid waste separator for processing. Once the water in the process pit reaches the low level setting, due to the pumping of water to the solid waste separator, the water sensor level switch deactivates the process pit agitator pump, and water from the process pit stops going to the solid waste separator.

In another aspect of the invention, for dairy farms of greater than 5,000 cows, more than one process pit and solid waste separator may be installed and at least one storage lagoon is used in the processing of flushed water from the dairy cow flush lanes.

In another aspect of the invention, the process pit may have a flush pump, and the storage lagoon may have a pump that pumps water from the storage lagoon to the process pit instead of to the flush lanes. Thus, during a flush cycle, water is pumped from the process pit to the flush lanes, and water from the storage lagoon is pumped to the process pit.

While embodiments and applications of this invention have been shown and described, it would be apparent to those skilled in the art that many more modifications than mentioned above are possible without departing from the inventive concepts herein. Further, although this invention has been described for use on dairy cow farms, this invention may also be used for other animal-intensive uses. The quantities referred to in this invention are scalable and are non-limiting. The quantities referred to in this invention may be adjusted to fine tune the flushing and solid waste separation processes to correspond to each unique use of this invention. The invention, therefore, is not to be restricted except in the spirit of the appended claims.

What is claimed is:

1. An apparatus for flushing flush lanes comprising:

a process pit for flushed water;

an agitator pump in the process pit;

a first flush pump and timer in the process pit;

a water sensor level switch in the process pit;

a solid waste separator;

a storage lagoon for water processed through the solid waste separator;

a second flush pump and timer in the storage lagoon;

wherein the first flush pump pumps water from the process pit into the flush lanes for a first pre-selected amount of time during a day and wherein the second flush pump pumps water from the storage lagoon into the flush lanes for a second pre-selected amount of time during a day, and wherein when the water in the process pit reaches a first pre-selected height in the process pit, the water sensor level switch activates the agitator pump wherein the agitator pump pumps water from the process pit to the solid waste separator, and wherein when the water in the process pit reaches a second pre-selected height in the process pit, the water sensor level switch deactivates the agitator pump, thus stopping the pumping of water from the process pit to the solid waste separator.

2. The apparatus of claim 1 wherein a tunnel press conveyor collects the solid waste removed at the solid waste separator and further removes moisture from said solid waste.

3. The apparatus of claim 1 wherein a second solid waste separator is placed in parallel with the first solid waste separator.

4. The apparatus of claim 1 wherein a second solid waste separator is placed in series with the first solid waste separator, and wherein the second sold waste separator has a smaller mesh size than the first solid waste separator.

5. The apparatus of claim 1 wherein at least one of the flush pumps is a floating flush pump.

6. The apparatus of claim 1 wherein at least one of the flush pumps is a wall mounted flush pump.

7. The apparatus of claim 1 wherein the process pit is between 30,000 gallons and 100,000 gallons in capacity, wherein the first flush pump is between 30 horsepower and 60 horsepower in size, wherein the agitator pump is between 30 horsepower and 60 horsepower in size, wherein the second flush pump is between 10 horsepower and 50 horsepower in size, wherein the solid waste separator is between 500 gallons/minute and 3,000 gallons/minute in capacity, and wherein the storage lagoon is between 2,700,000 and 54,000,000 gallons in capacity.

8. The apparatus of claim 1 wherein there is at least one set of flush lanes, wherein each set of flush lanes is coupled to one process pit, wherein said process pit is coupled to a solid waste separator, wherein said solid waste separator is coupled to a storage lagoon,-wherein said storage lagoon is coupled to at least one set of flush lanes.

9. The apparatus of claim 8, wherein a plurality of process pits are between 30,000 and 100,000 gallons in capacity, wherein at least one storage lagoon is between 2,700,000 and 54,000,000 gallons in capacity.

10. An apparatus for flushing flush lanes comprising:
a process pit for flushed water;
an agitator pump in the process pit;
a first flush pump and timer in the process pit;
a water sensor level switch in the process pit;
a solid waste separator;
a storage lagoon for water processed through the solid waste separator;
a first storage lagoon pump and timer in the storage lagoon;
wherein the first flush pump pumps water from the process pit into the flush lanes for a first pre-selected amount of time during a day and wherein the first storage lagoon pump pumps water from the storage lagoon into the process pit for a second pre-selected amount of time during a day, and wherein when the water in the process pit reaches a first pre-selected height in the process pit, the water sensor level switch activates the agitator pump wherein the agitator pump pumps water from the process pit to the solid waste separator, and wherein when the water in the process pit reaches a second pre-selected height in the process pit, the water sensor level switch deactivates the agitator pump, thus stopping the pumping of water from the process pit to the solid waste separator.

* * * * *